(12) United States Patent
Meiser (10) Patent No.: US 11,612,245 B2
(45) Date of Patent: Mar. 28, 2023

(54) PRESS-LOCKED GRATING

(71) Applicant: Gebrueder Meiser GmbH, Schmelz (DE)

(72) Inventor: Wolfgang Meiser, Saarbruecken (DE)

(73) Assignee: Gebrueder Meiser GmbH, Schmelz (DE)

( * ) Notice: Subject to any disclaimer, the term of this patent is extended or adjusted under 35 U.S.C. 154(b) by 18 days.

(21) Appl. No.: 17/257,930

(22) PCT Filed: May 9, 2019

(86) PCT No.: PCT/DE2019/100420
§ 371 (c)(1),
(2) Date: Jan. 5, 2021

(87) PCT Pub. No.: WO2020/007390
PCT Pub. Date: Jan. 9, 2020

(65) Prior Publication Data
US 2021/0282553 A1    Sep. 16, 2021

(30) Foreign Application Priority Data

Jul. 6, 2018    (DE) ..................... 20 2018 103 893.1

(51) Int. Cl.
*A47B 96/02* (2006.01)
*F16B 5/00* (2006.01)

(52) U.S. Cl.
CPC .......... *A47B 96/021* (2013.01); *F16B 5/0016* (2013.01); *F16B 5/0084* (2013.01)

(58) Field of Classification Search
CPC .... A47B 96/021; F16B 5/0084; F16B 5/0016; E04C 2/423; E04C 2/425; E04C 2/428; E04B 9/122; E04F 19/10; E03F 5/06
See application file for complete search history.

(56) References Cited

U.S. PATENT DOCUMENTS

| | | | | |
|---|---|---|---|---|
| 1,184,309 A | * | 5/1916 | Berson | E04B 9/122 |
| | | | | 29/897.15 |
| 1,426,736 A | * | 8/1922 | Hess | E04C 2/425 |
| | | | | 5/264.1 |

(Continued)

FOREIGN PATENT DOCUMENTS

| DE | 80 14 894 U1 | 12/1987 |
|---|---|---|
| DE | 88 08 144 U1 | 8/1988 |

(Continued)

OTHER PUBLICATIONS

International Search Report in PCT/DE2019/100420, dated Jun. 28, 2019.

*Primary Examiner* — Devin K Barnett
(74) *Attorney, Agent, or Firm* — Collard & Roe, P.C.

(57) ABSTRACT

A press locked grating, in particular for use as a shelf for plate or heavy-duty shelves, has two longitudinal sides and cross members and longitudinal members having an I-shaped profile arranged between the longitudinal sides and at right angles to each other. The longitudinal members are inserted or pressed into punched holes of the cross members open towards the grating upper side. The longitudinal sides are formed in cross-section as a profile that includes at least first and second orthogonal legs. Each cross member has a punched hole at each end, in which the first leg is arranged and firmly connected thereto by a connecting method. The first leg is inserted or pressed into the punched hole, thereby achieving a first connection of the profile to the cross member, and has at least one deformation, thereby fixing the insertion or press connection of the cross member to the profile.

8 Claims, 5 Drawing Sheets

(56) References Cited

U.S. PATENT DOCUMENTS

| | | | | |
|---|---|---|---|---|
| 1,428,230 | A * | 9/1922 | Hess | E04C 2/425 105/457 |
| 2,031,779 | A * | 2/1936 | Ladd | B21D 47/005 52/669 |
| 2,084,118 | A * | 6/1937 | Zabriskie | E04C 2/425 52/667 |
| 3,469,359 | A * | 9/1969 | Nagin | E04C 2/425 52/669 |
| 3,645,510 | A * | 2/1972 | Klugman | B01J 19/305 52/667 |
| 3,864,887 | A * | 2/1975 | Arens | E04F 19/10 52/473 |
| 3,943,675 | A * | 3/1976 | Wyss | E04C 2/423 52/177 |
| 4,067,094 | A * | 1/1978 | Ittner | B64D 33/04 29/889.22 |
| 4,727,704 | A * | 3/1988 | Carlton | E04C 2/425 52/177 |
| 4,903,444 | A * | 2/1990 | Berndt, Jr. | E04C 2/425 52/177 |
| 5,024,550 | A * | 6/1991 | Mainville | E03F 5/06 210/163 |
| 5,203,544 | A * | 4/1993 | Webb | A01K 3/002 256/17 |
| D374,727 | S * | 10/1996 | Emanuele | D25/152 |
| 5,771,647 | A * | 6/1998 | Kempen | F24F 13/08 52/302.1 |
| 5,865,007 | A * | 2/1999 | Bowman | E04C 2/427 52/177 |
| D410,709 | S * | 6/1999 | Edwards | D21/561 |
| 6,908,256 | B1 * | 6/2005 | Humphries | E03F 5/06 210/163 |
| 7,931,421 | B2 * | 4/2011 | Rathmann | E03F 5/06 404/2 |
| 8,132,385 | B2 * | 3/2012 | Phillips | E04C 2/427 119/529 |
| 10,184,239 | B2 * | 1/2019 | Meincke | E04C 2/421 |

FOREIGN PATENT DOCUMENTS

| | | | |
|---|---|---|---|
| DE | 20 2009 015 918 U1 | 3/2010 | |
| DE | 20 2016 104 526 U1 | 9/2016 | |
| DE | 102015108298 A1 * | 12/2016 | E04C 2/423 |
| DE | 20 2017 103 028 U1 | 8/2018 | |
| EP | 1 559 346 A1 | 7/1970 | |
| EP | 1 457 618 A1 | 9/2004 | |

* cited by examiner

PRESS-LOCKED GRATING

CROSS REFERENCE TO RELATED APPLICATIONS

This application is the National Stage of PCT/DE2019/100420 filed on May 9, 2019, which claims priority under 35 U.S.C. § 119 of German Application No. 20 2018 103 893.1 filed on Jul. 6, 2018, the disclosure of which is incorporated by reference. The international application under PCT article 21(2) was not published in English.

BACKGROUND OF THE INVENTION

1. Field of the Invention

The present invention relates to a press locked grating, in particular for use as a shelf for plate shelves or heavy-duty shelves, with two longitudinal sides and cross members and longitudinal members arranged between the longitudinal sides, the cross members and the longitudinal members having an I-shaped profile, the longitudinal members being inserted or pressed into punched holes of the cross members which are open towards the upper side of the press locked grating, wherein the longitudinal members and the cross members are arranged at right angles to one another, and wherein the longitudinal sides are formed in cross-section as a profile, wherein the profile of the longitudinal sides comprises at least a first leg and a second leg arranged substantially at right angles to the first leg, wherein each of the cross members has a punched hole at each end, in which the first leg of the profile of the longitudinal sides is arranged and is firmly connected thereto by a connecting method.

2. Description of the Related Art

Due to possible fire hazard in warehouses, gratings placed in plate shelves or heavy-duty shelves are used for storage of goods. These gratings, as disclosed for example in DE 80 14 894 U1, have profiles on their longitudinal sides, so that they can be picked up on carrier beams or uprights of the shelves. Between the longitudinal sides of the grating there are longitudinal and transverse bars on which the goods are stored. The design of the longitudinal and transverse bars also creates open spaces through which extinguishing media (e.g. extinguishing water) from sprinkler systems, which are often located above the gratings, can pass through the open spaces of the gratings in the event of a fire. The longitudinal and transverse bars of the gratings are designed in such a way that the highest possible load-bearing capacity of the gratings is achieved and yet sufficient open spaces for the passage of water can be provided. Accordingly, the longitudinal sides and the longitudinal and transverse bars of the aforementioned gratings are made of steel materials which, in order to provide the desired stability and load-bearing capacity, are not designed as hollow bodies.

The disadvantage of the above-described gratings is that these gratings themselves have a high dead weight in order to guarantee high load-bearing capacities. Accordingly, the plate shelves and heavy-duty shelves must be constructed in such a way that they can carry not only the goods but also the gratings. These highly stressed plate shelves and heavy-duty shelves are relatively expensive to purchase. A further disadvantage is that high material costs are incurred in order to guarantee the desired load-bearing capacity.

EP 1 559 346 A1 and DE 88 08 144 U1 therefore disclose shelving gratings that have two longitudinal sides and cross members arranged between the longitudinal sides, whereby the longitudinal sides are designed as an open U-profile in cross-section. The open sides of the cross members are aligned with the bottom of the grating. Each of these cross members has recesses at each end, which can be detachably coupled to the longitudinal sides via support strips.

From EP 1 457 618 A1, a grating with elongated structural components is known, whereby at least two opposite end areas of structural components are each connected to retaining bodies which can be supported on external abutments via outwardly extending areas comprising at least one bearing surface, wherein structural components are provided with recesses which project into their front ends and which each serve at least in part as substantially slot-shaped retaining receptacles for a retaining member of a retaining body engaging therein, wherein the distance between mutually opposite marginal edges defining the retaining receptacle is small in relation to the longitudinal extent of the retaining member engaging therein.

DE 20 2016 104 526 U1 describes a support structure with a grating which can be placed on at least two opposite supports, the grating comprising support bars and filler bars arranged at an angle thereto and connected thereto, characterised in that at least one support bar is engaged with at least one suspension angle which comprises a leg which can be placed on a support.

A shelf base support for heavy loads is known from DE 20 2009 015 918 U1, comprising at least two cross members which are to be connected via a plug connection to two support profiles which are aligned in mirror image to each other and each have at least a first horizontal profile leg for support on a shelf support, a vertical profile leg and an adjoining second horizontal profile section.

Furthermore, the company Gebr. Meiser GmbH offers U-Profile shelving gratings, which have two longitudinal sides and cross members arranged between the longitudinal sides, whereby the longitudinal sides are designed as a profile in cross-section, whereby the profile comprises at least a first leg and a second leg arranged essentially at right angles to the first leg, wherein at least two of the cross members have, in cross-section, an open profile, the open side of which is oriented towards the underside of the grating, each of these cross members having at least one punched hole at each end, wherein the first leg of the profile is arranged in each punched hole, wherein the first leg of the profile is firmly connected to the grating by means of a material-locking joining process, in particular a resistance welding process.

However, the welding process used requires constant monitoring and regulation of the welding parameters in the joining process, since any change in the nature of the starting materials is reflected as a disturbance variable in the process and in the quality of the production result. In particular, the monitoring and regulation of the welding parameters in the joining process must be carried out when very thin, but also differently thick material thicknesses, as well as pre-coated materials must be joined together. If a continuous monitoring and regulation of the welding parameters in the joining process would not take place, the durability of the weld seam in use could be impaired, which could lead to the failure of the weld seam and thus to the destabilization of the shelf grid.

SUMMARY OF THE INVENTION

The invention is therefore based on the task of providing a press locked grating which is lighter and less expensive or requires less monitoring in production than the previously known state of the art, without impairing the structural stability and load-bearing capacity.

The task of the invention is solved by a press locked grating according to the preamble in that the first leg of the profile of the longitudinal sides is inserted or pressed into the punched hole, whereby a first connection of the profile of the longitudinal sides with the cross member is achieved, and by the subsequent introduction of deformations to the right and left of the cross member, preferably immediately adjacent to it, in the first leg of the profile of the longitudinal sides, a horizontal displacement of the components against each other is prevented, thus achieving a fixing of the plug-in or press connection of the cross member with the profile of the longitudinal sides.

In this way an exceptionally stable press locked grating can be produced quickly and economically.

Since several of these gratings are arranged as shelves in panel shelves or heavy-duty shelves, a reduction in the weight of the gratings can reduce the cost of the shelf construction, since these, while maintaining the same stability, have to carry less load, thus reducing the material costs (to achieve this stability) for the shelves.

As the leg of the profile is inserted or pressed into the punching of the cross member, a fixation of the profile with the cross member is achieved. A protection against a displacement of the components (profile and cross member) against each other, is achieved by a further connection method, namely a form-fitting and/or force-locking connection method, in the course of which the deformation takes place.

An embossing is a deformation introduced into the leg using pressure, deep drawing or embossing tools.

It is advantageous that the deformation or deformations are located in the immediate proximity or directly next to the plug-in or press connection of the cross member with the profile. It is also advantageous that at least two deformations in the profile are arranged on both sides near or directly next to the plug-in or press connection, so that the plug-in or press connection of the cross member with the profile is fixed on both sides.

A preferred embodiment of the invention provides that the profile is designed as a Z-profile, an L-profile or a polygonal profile, the Z-profile comprising a third leg arranged substantially parallel to the first leg and a second leg connecting the first and second legs, the L-profile comprises a first leg and a second leg arranged substantially perpendicular to the first leg, and the polygonal profile comprises a second leg arranged substantially parallel to the first leg, a connecting part connecting the first and second legs, and a third leg arranged substantially parallel to the connecting part, the third leg being connected to the free end of the second leg.

It is part of the invention that the press locked grating (1) consists of steel, preferably pre-galvanized steel, stainless steel or aluminum.

It can be advantageous that the grating is made of steel, whereby the steel is a pre-galvanized steel.

A further embodiment of the invention provides advantageously that the surfaces of the longitudinal sides and the cross members are coated with a coating material, the coating material protecting the surfaces from corrosion and/or having a fire-repellent effect.

It is within the scope of the invention that the ratio of the bearing load of the press locked grating to the dead weight of the press locked grating is in the range of 10 to 200.

This means that the grating according to the invention has a load-bearing capacity that is 10 to 200 times its dead weight.

Furthermore, it is preferred that at least 70% of the area covered by the press locked grating is a free projection area.

This design is particularly advantageous in order to minimize the shadowing effect of the grating (which consists of cross members and longitudinal sides) in the event of a fire, so that extinguishing media from sprinkler systems can pass through the free projection surfaces (passage surfaces) of the grating.

It is advantageous that at least one of the punched holes at the respective end of a cross member has an inlet contour with at least one baffle, thus enabling a centered insertion and a force- and/or form-fit connection of the first leg of the profile with the cross member.

In this embodiment of the invention, it is advantageous that the at least one punched hole at the respective end of the cross member is wedge-shaped.

Also included in the scope of the invention is a method for producing a press locked grating, in particular for use as a shelf for plate shelves or heavy-duty shelves, with two longitudinal sides and cross members and longitudinal members arranged between the longitudinal sides, wherein the cross members and the longitudinal members have an I-shaped profile, wherein the longitudinal members are inserted or pressed into punched holes of the cross members which are open towards the upper side of the press locked grating, wherein the longitudinal members and the cross members are arranged at right angles to each other, and wherein the longitudinal sides are formed in cross-section as a profile, wherein the profile of the longitudinal sides comprises at least a first leg and a second leg arranged substantially at right angles to the first leg, wherein each of the cross members has at each end a punched hole in which the first leg of the profile of the longitudinal sides is arranged and is firmly connected thereto by a connecting method, wherein in a first step the first leg of the profile of the longitudinal sides is inserted or pressed into the punched hole, whereby a first connection of the profile of the longitudinal sides with the cross member is achieved, and subsequent deformations to the right and left of the cross member, preferably immediately adjacent to it, in the first leg of the profile of the longitudinal sides, thus preventing horizontal displacement of the components in relation to each other, so that the plug-in or press connection of the cross member with the profile of the longitudinal sides is fixed.

BRIEF DESCRIPTION OF THE DRAWINGS

In the following, examples of the invention are explained in more detail, but not limited to drawings. They show the following.

DETAILED DESCRIPTION OF THE PREFERRED EMBODIMENTS

FIGS. 1 to 7 show a first variant of the grating (1) according to the invention with two longitudinal sides (2a, 2b) and cross members (3a-3g) arranged between the longitudinal sides (2a, 2b) in perspective view. The longitudinal sides (2a, 2b) are designed in cross-section as a Z-profile, the Z-profile comprising a first leg (Z1), a second leg (Z2) arranged substantially parallel to the first leg, and a connecting part (Z3) connecting the first and second legs. The cross members (3a) have an I-shaped profile in cross-section.

Figure 1:
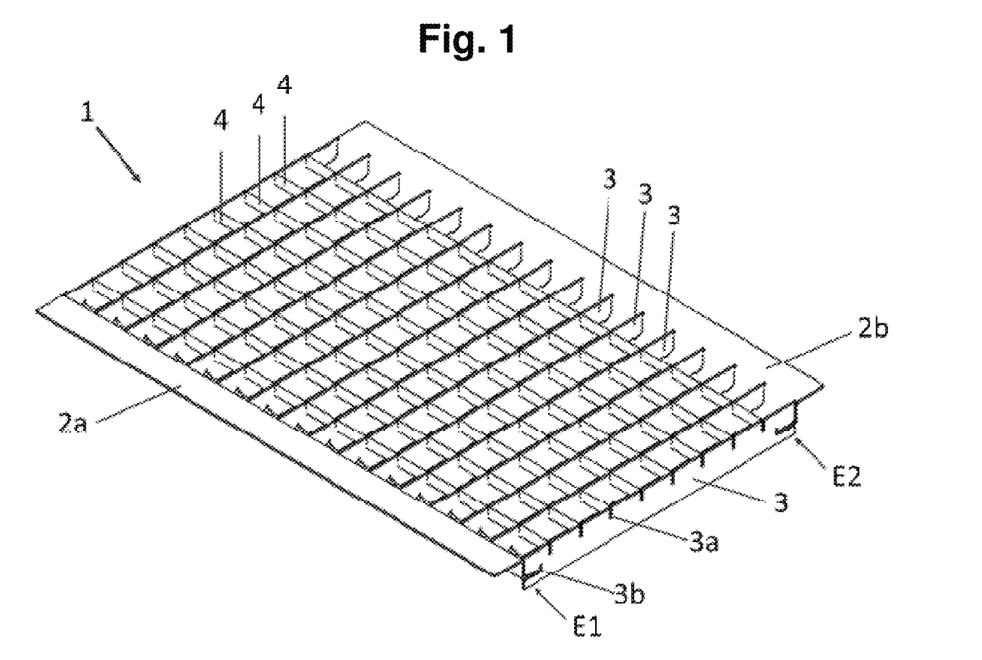
FIG. 1 a first variant of the press locked grating in perspective view.
Figure 2:
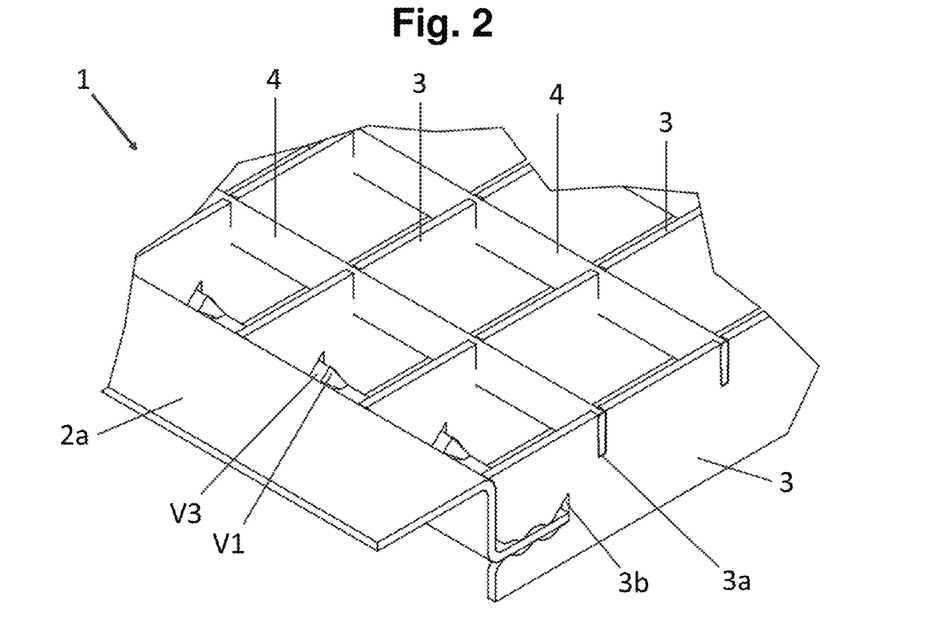
FIG. 2 a detailed view of FIG. 1.

In FIG. 2, the connection of a cross member (3b) with a longitudinal side (2a), which is designed as a Z-profile in cross-section, is shown enlarged in perspective view. As shown, the first leg (Z1) of the Z-profile is inserted or pressed into the punched holes of the cross beam at one end (E1) of the cross member. Since the cross member (3b) is I-shaped in cross-section, the cross member has two punched holes at each end. The punched holes preferably have a baffle and/or are wedge-shaped. By inserting or pressing the first leg (Z1) of the Z-profile into the punched holes of the cross member (3b), the components (cross member and longitudinal side) are fixed against each other. The subsequent introduction of deformations (V1, V3), for example to the right and left of the cross member, preferably directly next to it, into the first leg (Z1) of the profile prevents a horizontal displacement of the components relative to each other and also ensures that the subsequent deformation of the first leg (Z1) causes the first leg (Z1) to be vertically deformed or wedged in the punched area. The latter prevents the first leg (Z1) from being pulled out of the punched holes of the cross member.

Figure 3:
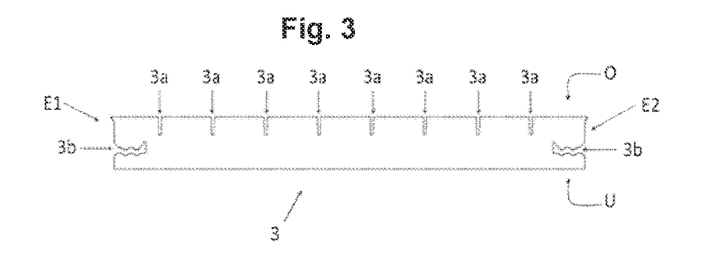
FIG. 3 a side view of the cross member.

FIG. 3 shows a cross member, I-shaped in cross-section, with at least two punched holes at each end (E1, E2), in perspective view. It is provided that at least one of the punched holes (3b) is wedge-shaped at the respective end (E1, E2).

Figure 4:
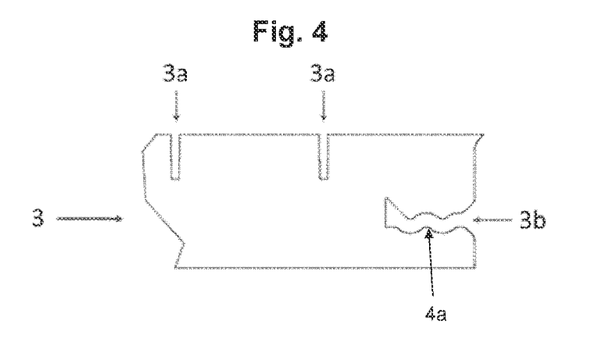
FIG. 4 a detailed view of FIG. 2.

FIG. 4 shows an enlarged section of the I-shaped cross member from FIG. 3 with a baffle-shaped punched hole (4a) at the enlarged end (E1).

Figure 5:
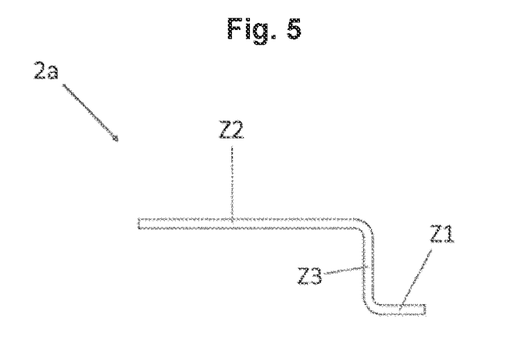
FIG. 5 the profile in a side view.

FIG. 5 shows the Z-profile in a side view with the first leg (Z1) at one end, the third leg (Z2) at the other end and the second leg (Z3) connecting them.

Figure 6:
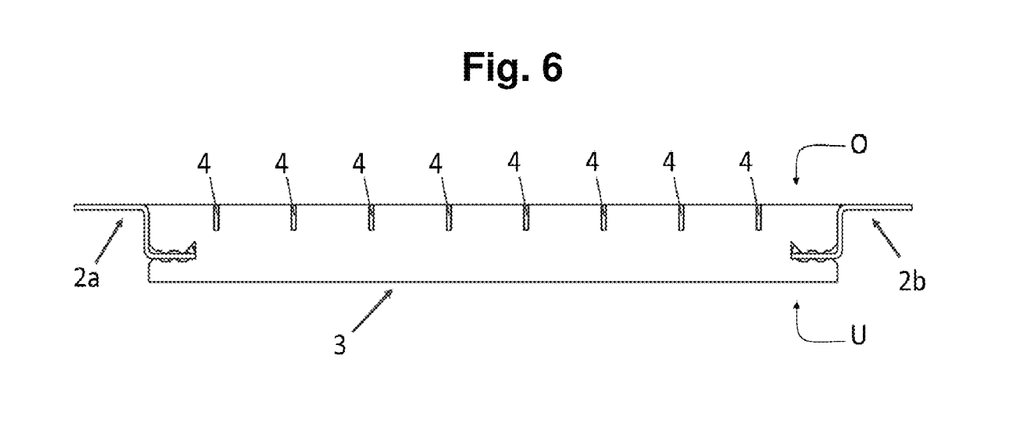
FIG. 6 the press locked grating in a side view.

FIG. 6 shows the press locked grating in a side view. It can be seen that the Z-profile (2a) is arranged with its first leg (Z1) in the punched hole and is fixed there. The deformations (V) can be introduced into the longitudinal side both (temporally) before and after the connection with the cross member.

Figure 7:
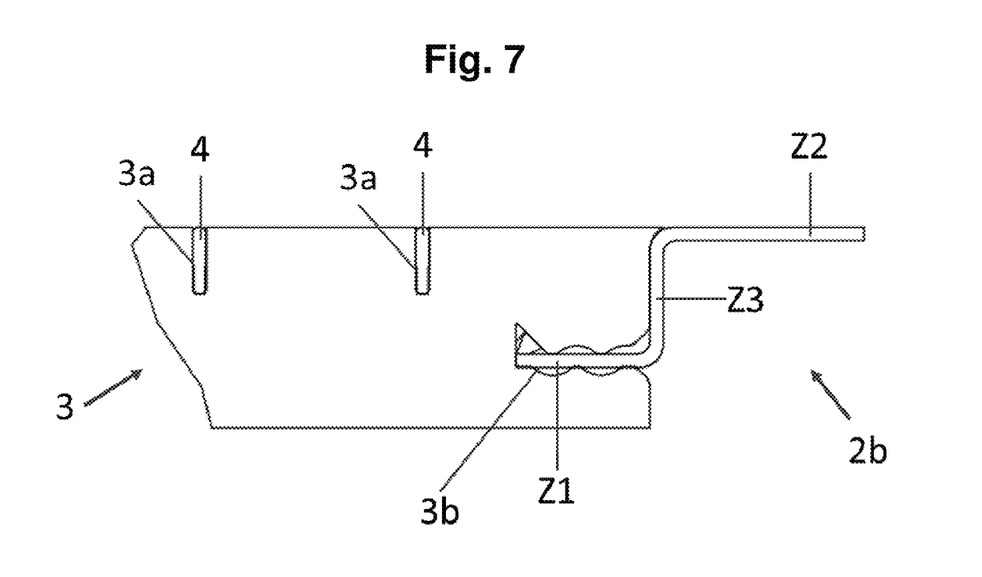
FIG. 7 a detailed view of FIG. 6.
Figure 8:
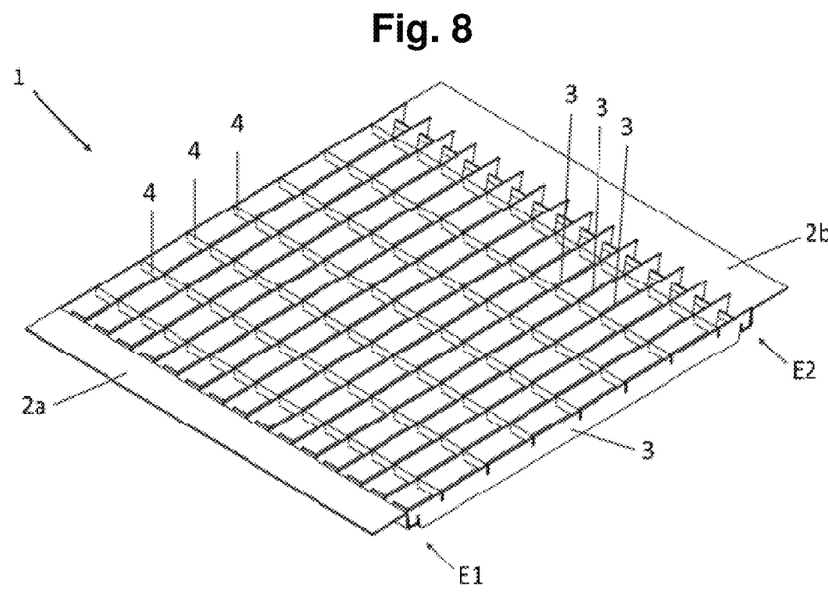
FIG. 8 a second variant of the press locked grating according to the invention, in which the subsequently introduced deformations are not shown in perspective view, FIG. 9 a detailed view of FIG. 8, FIG. 10 a side view of the crossmember, FIG. 11 a detailed view of FIG. 10,
FIG. 12 the profile in a side view.
Figure 9:
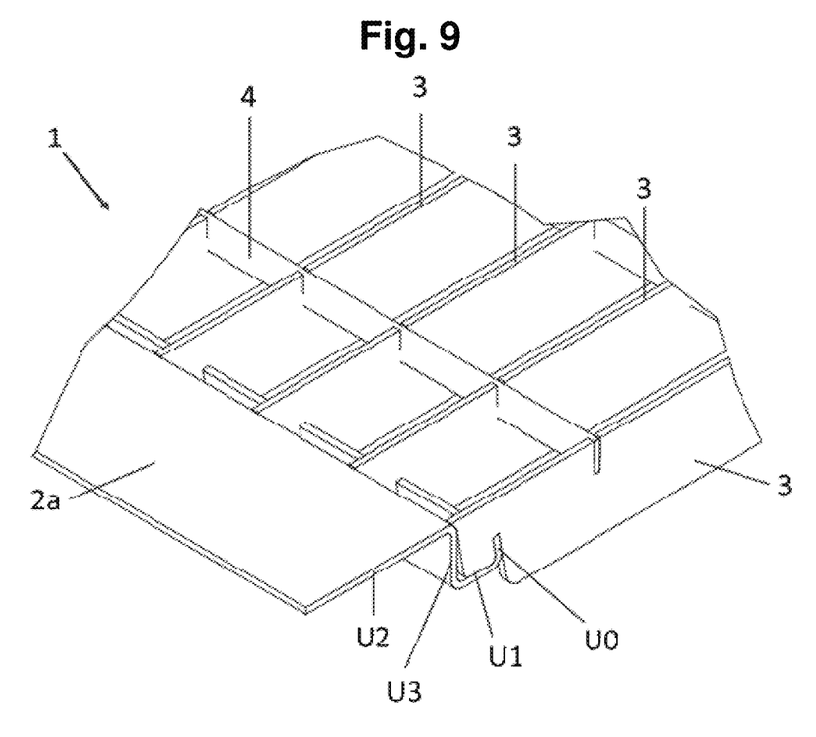

FIG. 7 shows an enlarged section of the Z-profile longitudinal side (2a) of FIG. 6.

FIGS. 8 to 12 show a second variant of the invention, in which the deformations introduced subsequently are not shown. In this variant, the longitudinal sides (2b) are designed in cross section as a polygonal profile (U0-U3), the polygonal profile (U0-U3) comprising a second leg (U3) arranged substantially parallel to the first leg (U0), a connecting part (U1) connecting the first and the second leg, and a third leg (U2) arranged substantially parallel to the connecting part (U1), the third leg (U2) being connected to the free end of the second leg. Punched holes (3b) are provided at both ends (E1, E2) of the cross member (3), in which the first leg (U0) of the polygonal profile (U0-U3) is arranged. The punched holes (3b) are, as shown, essentially vertical incisions that extend from the bottom of the cross member (3) towards the top.

Figure 10:
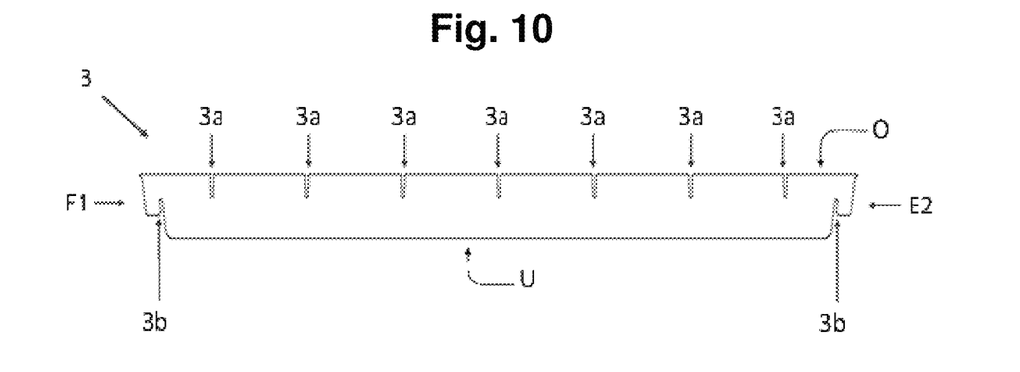
Figure 11:
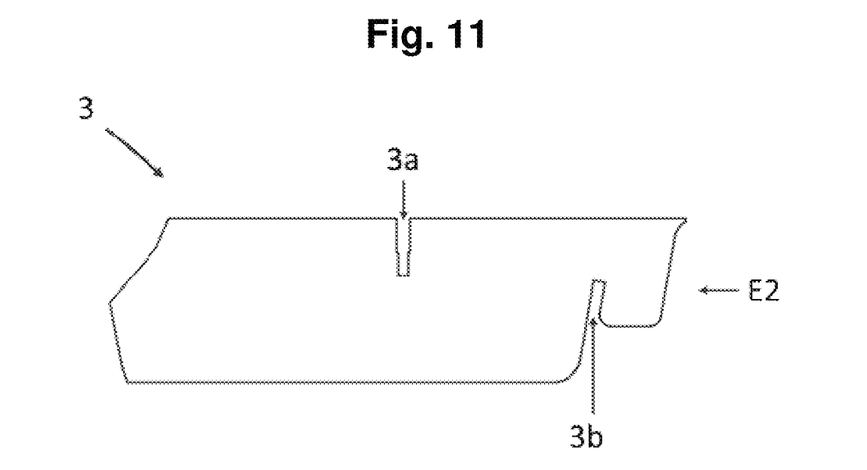

FIG. 11 shows a detailed view of the cross member (3) from FIG. 10.

Figure 12:
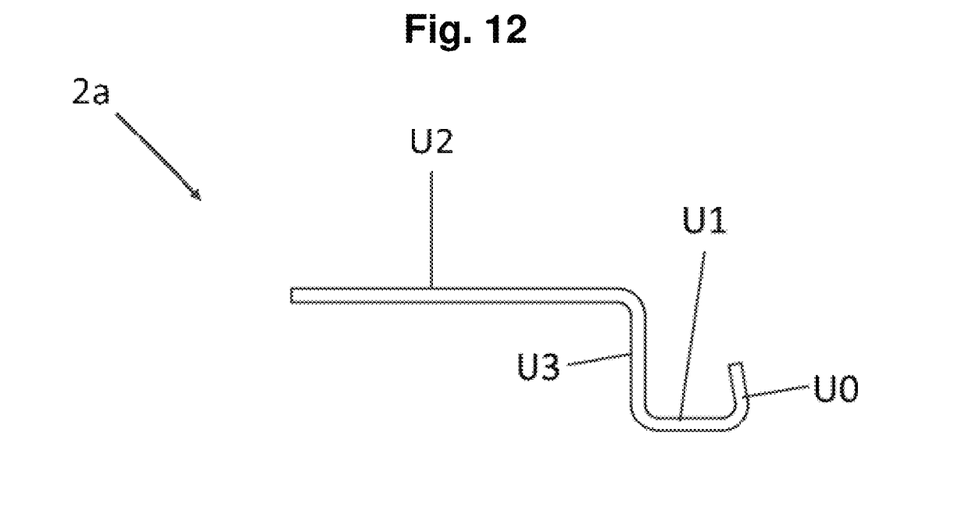

FIG. 12 shows the polygonal profile in a side view with the first leg (U0), the second leg (U3) essentially parallel to it, the connecting part (U1) connecting them, to which in turn the third leg (U2) runs parallel.

For further features not shown in the figures, reference is made to the general part of the description.

The invention claimed is:

1. A press locked grating comprising:
two longitudinal sides;
a plurality of cross members arranged between the two longitudinal sides, each cross member of the plurality of cross members having an I-shaped profile, a plurality of first punched holes which are open toward an upper side of the press locked grating and second punched holes at a first end and a second end of the cross member; and
a plurality of longitudinal members arranged between the two longitudinal sides and at right angles to the plurality of cross members, each longitudinal member of the plurality of longitudinal members having an I-shaped profile and being inserted or pressed into a respective first punched hole of the plurality of first punched holes;
wherein each longitudinal side of the two longitudinal sides is formed in cross-section as a profile comprising at least a first leg and a second leg arranged substantially at a right angle to the first leg;
wherein the first leg of the profile of each longitudinal side of the two longitudinal sides is inserted or pressed into a respective second punched hole along a transverse direction to achieve a first connection of each profile with the cross members; and
wherein the first leg of the profile of each longitudinal side of the two longitudinal sides comprises a plurality of pairs of deformations that extend upwardly from the first leg of each longitudinal side respectively, the plurality pairs of deformations are subsequently introduced, after insertion of each first leg of each profile into the respective second punched hole, to a right and left in an immediate proximity or directly next to a plug-in or press connection of a corresponding cross member from the plurality of cross members with each profile respectively, thereby preventing a horizontal displacement of each longitudinal sides relative to the respective cross members along a horizontal direction that is perpendicular to the transverse direction and fixes the plug-in or press connection of the respective cross members with each profile of each longitudinal side respectively.

2. The press locked grating according to claim 1, wherein the profile is designed as at least one of a Z-profile comprising a third leg arranged substantially parallel to the first leg and a connecting part connecting the first leg and the second leg, an L-profile comprising the first leg and the second leg arranged substantially perpendicular to the first leg, and a polygonal profile comprising the second leg arranged substantially parallel to the first leg, a connecting part connecting the first leg and the second leg, and a third leg arranged substantially parallel to the connecting part, the third leg being connected to a free end of the second leg.

3. The press locked grating according to claim 1, wherein the press locked grating comprises steel, stainless steel or aluminum.

4. The press locked grating according to claim 1, wherein a ratio of a bearing load of the press locked grating to a dead weight of the press locked grating is in a range of 10 to 200.

5. The press locked grating according to claim 1, wherein at least 70% of an area covered by the press locked grating is a free projection area.

6. The press locked grating according to claim 1, wherein at least one of the second punched holes has an inlet contour with at least one baffle and enables a centered insertion and at least one of a force-fit and a form-fit connection of the first leg of the profile with the cross member.

7. The press locked grating according to claim 1, wherein the second punched holes are wedge-shaped.

8. A method of manufacturing a press locked grating comprising the steps of:

providing two longitudinal sides;

providing a plurality of cross members that are arranged between the two longitudinal sides, each cross member of the plurality of cross members having an !-shaped profile, a plurality of first punched holes which are open toward an upper side of the press locked grating and second punched holes at a first end and a second end of the cross member; and providing a plurality of longitudinal members that are arranged between the two longitudinal sides and at right angles to the plurality of cross members, each longitudinal member of the plurality of longitudinal members having an I-shaped profile;

inserting or pressing each longitudinal member into a respective first holes of the plurality of first punched holes;

wherein each longitudinal side of the two longitudinal sides is formed in cross-section as a profile comprising at least a first leg and a second leg arranged substantially at a right angle to the first leg;

inserting or pressing each first leg of the profile of each longitudinal side of the two longitudinal sides into a respective second punched hole along a transverse direction to achieve a first connection of each profile with the cross members; and wherein the first leg of the profile of each longitudinal side of the two longitudinal sides comprises a plurality of pairs of deformations that extend upwardly from the first leg of each longitudinal side respectively;

subsequently introducing the plurality pairs of deformations to a right and left in an immediate proximity or directly next to a plug-in or press connection of a corresponding cross member from the plurality of cross members with each profile respectively, after insertion of each first leg of each profile into a corresponding punched hole, thereby preventing a horizontal displacement of each longitudinal sides relative to the respective cross members along a horizontal direction that is perpendicular to the transverse direction and fixes the plug-in or press connection of the respective cross members with each profile of each longitudinal side respectively.

* * * * *